(12) United States Patent
Doliov

(10) Patent No.: US 7,136,860 B2
(45) Date of Patent: Nov. 14, 2006

(54) SYSTEM AND METHOD TO DETERMINE THE VALIDITY OF AN INTERACTION ON A NETWORK

(75) Inventor: Stephan Doliov, San Francisco, CA (US)

(73) Assignee: Overture Services, Inc., Pasadena, CA (US)

( * ) Notice: Subject to any disclaimer, the term of this patent is extended or adjusted under 35 U.S.C. 154(b) by 863 days.

(21) Appl. No.: 09/765,802

(22) Filed: Jan. 19, 2001

(65) Prior Publication Data

US 2002/0002445 A1 Jan. 3, 2002

Related U.S. Application Data

(60) Provisional application No. 60/182,147, filed on Feb. 14, 2000.

(51) Int. Cl.
*G06F 17/30* (2006.01)

(52) U.S. Cl. .............................. 707/101; 707/9; 707/10; 707/102; 707/104

(58) Field of Classification Search ...................... 707/9, 707/10, 101, 102, 104, 2, 3, 5; 709/203, 218, 709/223; 713/201; 706/47
See application file for complete search history.

(56) References Cited

U.S. PATENT DOCUMENTS

| | | | |
|---|---|---|---|
| 5,220,655 A | 6/1993 | Tsutsui | 709/229 |
| 5,231,593 A | 7/1993 | Notess | 702/180 |
| 5,345,595 A | 9/1994 | Johnson et al. | 455/410 |
| 5,375,244 A | 12/1994 | McNair | 710/200 |
| 5,485,196 A | 1/1996 | Nathan et al. | 725/93 |
| 5,557,686 A | 9/1996 | Brown et al. | 382/115 |
| 5,679,938 A | 10/1997 | Templeton et al. | 235/379 |
| 5,679,940 A | 10/1997 | Templeton et al. | 235/380 |
| 5,682,317 A * | 10/1997 | Keeler et al. | 701/101 |

(Continued)

FOREIGN PATENT DOCUMENTS

| | | |
|---|---|---|
| CN | 1209298 A | 2/1999 |
| WO | WO 00/54458 | 9/2000 |
| WO | WO 00/73968 | 12/2000 |

OTHER PUBLICATIONS

News of The Week articles, *Telephony*, May 1, 1995, pp. 8 and 10.
Nuts 'N Bolts articles, *Target Marketing*, Oct. 1997, 1 page.
DoubleClick Testltl, obtained at the internet address: http://web.archive.org/web/19980205034316/www.doubleclick.com/nf/adinfo/testiset.htm, dated Oct. 16, 2002, 4 pages.
DoubleClick Frequently Asked Questions, obtained at the internet address: http://web.archive.org/web/19980205033925/www.doubleclick.com/nf/adinfo/facts.htm, dated Oct. 16, 2002, 5 pages.
"New Service Puts Ad Auction, Search Engine Under One Roof", article from Electronic Advertising & Marketplace Report, *Simba Information, Inc.* Apr. 28, 1998, 2 pages.

(Continued)

*Primary Examiner*—Thuy N. Pardo
(74) *Attorney, Agent, or Firm*—Brinks Hofer Gilson & Lione

(57) ABSTRACT

The methods and systems of the invention utilize limited data to yield information about the validity of any given interaction with a website. Once validity information is available, an operator can determine whether or not to continue offering interactions to a given user. The determination could also relate to whether to report website interaction statistics based on undesired interactions, how to handle billing or payment for such undesired interactions, and what type of content to send to users who are interacting with the website in an undesirable manner.

37 Claims, 8 Drawing Sheets

U.S. PATENT DOCUMENTS

| | | | | |
|---|---|---|---|---|
| 5,692,107 | A | * 11/1997 | Simoudis et al. | 706/12 |
| 5,696,702 | A | 12/1997 | Skinner et al. | 702/26 |
| 5,724,488 | A | 3/1998 | Prezioso | 706/52 |
| 5,754,938 | A | * 5/1998 | Herz et al. | 725/116 |
| 5,778,367 | A | 7/1998 | Wesinger, Jr. et al. | |
| 5,781,909 | A | 7/1998 | Logan et al. | 707/200 |
| 5,796,951 | A | 8/1998 | Hammer et al. | 709/223 |
| 5,796,952 | A | 8/1998 | Davis et al. | 709/224 |
| 5,802,299 | A | * 9/1998 | Logan et al. | 709/218 |
| 5,819,033 | A | 10/1998 | Caccavale | 709/224 |
| 5,862,223 | A | 1/1999 | Walker et al. | |
| 5,877,485 | A | 3/1999 | Swartz | 235/383 |
| 5,886,907 | A | 3/1999 | Abu-Amara et al. | 703/21 |
| 5,899,991 | A | 5/1999 | Karch | 707/5 |
| 5,960,409 | A | 9/1999 | Wexler | 705/14 |
| 5,960,429 | A | 9/1999 | Peercy et al. | 707/5 |
| 5,964,839 | A | 10/1999 | Johnson et al. | 709/224 |
| 5,966,700 | A | 10/1999 | Gould et al. | 705/38 |
| 5,974,417 | A | 10/1999 | Bracho et al. | 707/10 |
| 5,987,611 | A | 11/1999 | Freund | 713/201 |
| 6,012,052 | A | 1/2000 | Altschuler et al. | 707/2 |
| 6,052,785 | A | * 4/2000 | Lin et al. | 713/201 |
| 6,056,781 | A | * 5/2000 | Wassick et al. | 703/12 |
| 6,269,361 | B1 | 7/2001 | Davis et al. | 707/3 |
| 6,275,824 | B1 | * 8/2001 | O'Flaherty et al. | 707/9 |
| 6,285,987 | B1 | 9/2001 | Roth et al. | |
| 6,430,615 | B1 | * 8/2002 | Hellerstein et al. | 709/224 |
| 6,519,627 | B1 | * 2/2003 | Dan et al. | 709/203 |
| 2002/0004735 | A1 | 1/2002 | Gross | 707/5 |
| 2002/0156756 | A1 | * 10/2002 | Stanley et al. | 706/47 |

OTHER PUBLICATIONS

Google Search, communication from Jeffrey Brewer at Jeffrey@goto.com, titled "Need reverse stemming software", dated May 27, 1998, obtained at the internet address: http://groups.google.com/groups?selm=356CEE4A8DE882 AB%40goto.com, on Dec. 19, 2002, 1 page.

Ketchpel, Steven P. et al. "U–PAI: A Universal Payment Application Interface", conference material article from the Second USENIX Workshop on Electronic Commerce Proceedings, Oakland, California, Nov. 18–21, 1996, 17 pages.

Schwartz, Randal L., "Click–Through Tracking in Perl", *Web Techniques*, dated May 1998, located at the internet address: www.webtechniques.com, 3 pages.

Van Roeden, Adriaan, "Your Own Search Engine With SWISH, A Custom Search Facility For Your Web Site", *Web Techniques*, dated Nov. 1996, located at the internet address: www.webtechniques.com, pp. 63–66 pages.

Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.

Help on Making Queries—Search by Company or Product, obtained at the internet address: http://web.archive.org/web/19981203050002/solutions.sun.com/search–help.htm, printed on Dec. 19, 2002, 4 pages.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw> on Nov. 9, 2000, 2 pages.

Ubois, Jeff, article titled "He who pays the piper . . . ", *MIDRANGE Systems*, vol. 9, No. 12, 1996, p. 50 (1), reprinted by Cardinal Business Media, Inc.

Y. Takada, K. Matsumoto, and K. Torii, INSPEC Abstract No.: C9408–0301F–026, "*A Programmer Performance Measure Based on Programmer State Transitions In Testing and Debugging Process*", (one page abstract), 1994.

Examination Report from corresponding Canadian patent Application No. 2400199, dated Dec. 1, 2004, 4 pages.

Search Report from corresponding European patent Application No. EP 01909169.3, dated Feb. 11, 2004, 3 pages.

Examination Report from corresponding Great Britain patent Application No. GB0220998.0, dated Dec. 10, 2004, 2 pages.

Debar, Hervéet al., "Towards a taxonomy of intrusion–dectection systems", *Computer Networks*, vol. 31, 1999, pp. 805–822.

Denning, Dorothy, E., "An Intrusion–Dectection Model", *IEEE Transactions of Software Engineering*, 1987, vol. SE–13, No. 2, pp. 222–232.

Helman, Paul et al., "Statistical Foundations of Audit Trail Analysis for the Dectection of Computer Misuse", *IEEE Transactions on Software Engineering*, 1993 vol. 19, pp. 886–901.

Sarle, Warren S., "Neural Networks and Statistical Models", Proceedings of the 19th Annual SAS Users Group Inc. Conference, 1994, pp. 1–13.

* cited by examiner

SYSTEM AND METHOD TO DETERMINE THE VALIDITY OF AN INTERACTION ON A NETWORK

CROSS-REFERENCE TO RELATED APPLICATIONS

The present application claims the benefit of U.S. Provisional Application No. 60/182,147, filed Feb. 14, 2000, which is incorporated by reference herein.

FIELD OF THE INVENTION

The invention relates to statistical modeling and, more particularly, to the use of statistical modeling to determine the validity of an interaction on a computer network.

BACKGROUND

The transfer of information over computer networks has become an increasingly important means by which institutions, corporations, and individuals communicate and conduct business. Computer networks have grown over the years from independent and isolated entities established to serve the needs of a single group into vast Internets that interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

Many network operators, such as operators of commercial websites on the Internet, have reason to determine the validity of a given user interaction with the network or website. For example, with the recent growth of commercial enterprises conducting business on the Internet, a website operator may want to determine which interactions users have with the website are invalid or even criminally fraudulent. Four examples of website operators who have a compelling interest in the validity of interactions with a website are a website operator offering a trivia contest, the website operator who attempts to determine unique users without requiring detailed identifying information from its users, a search engine operator, and a pay for placement website operator.

First, the website operator offering a trivia contest in which prizes are awarded to participants who correctly answer a set of questions may be faced with participants who mask their true identity and enter the contest multiple times. The website operator is at risk of having the website's users abuse the process by which prizes are awarded and thereby is at risk both financially and in terms of credibility. If the website operator wants to allow for relatively anonymous use of the website while maintaining a fair contest, the operator must find some means of assessing which entries in the trivia contest are the entries of legitimate contestants and which entries are repeat entries of contestants attempting to gain an unfair advantage.

Second, many website operators attempt to count unique users visiting a site to establish rates for placing advertisements on the site. Although the user of user cookies is common, the cookie mechanisms offered by most browsers and web servers easily can be thwarted by even unsophisticated website users. A website operator who attempts to charge for advertising based on the number of unique visitors has a responsibility to be as accurate as possible when reporting the number of unique visitors, and would be well served to have non cookie based mechanisms to validate or invalidate the counts of unique users as established by user cookies. Failing to do so could result in lost advertising revenue.

Third, a search engine provider may be interested in determining and reporting the number of times certain search terms were requested by the search engine's users. If the search engine operator provides relatively anonymous access, it would be exceedingly simple for somebody to write a script which queries the same search term on a continuous basis. If the search engine operator cannot identify such illegitimate queries from actual user queries, the search engine operator can misreport the actual number of queries users (as opposed to software robots or bots) presented to the search engine. Such a misreporting of search term frequencies could undermine the overall credibility of the search engine as the search engine operator is presented with the risk of reporting a particular search term as popular, when in fact it was just the work of one user.

Fourth, a pay for placement and performance website operator leases space on a website to advertisers, charging them only when the space the advertiser is leasing gets used by the website's users, such as following a link to the advertiser's website. A pay for placement and performance website operator needs to be able to guarantee the validity of the pay for performance interactions which occur on the operator's website. A malicious user easily could generate interactions on the operator's website which would create charges for advertisers (buyers of the pay for placement and performance space) when such a user has no interest in the advertiser's products or services.

All of the above examples illustrate scenarios in which being able to ascertain valid from invalid interactions with a website are important to the website's operator. Those skilled in the art will recognize that known measures of uniqueness and authenticity, such as user cookie, client IP address, or user agent identification are mechanisms that can be easily thwarted. Thus, there is a need for a system to validate website interactions that overcome these deficiencies.

BRIEF SUMMARY OF THE PRESENTLY PREFERRED EMBODIMENTS

The present invention seeks to address the aforementioned problems by providing a system and method for collecting and processing data of user interactions with a network. More particularly, the system and method applies statistical modeling techniques to create risk scores for a given network interaction of interest. An operator uses the risk scores to determine the legitimacy or validity of an interaction with the network. For purposes of explanation, an example is used in which an operator desires to determine the validity of interactions on one type of network, the Internet.

In one embodiment, to determine the validity of an interaction, the operator collects data about the interaction. The collected data includes aggregate measures of behavior and unique features of a given interaction. Aggregate measures of behavior include, for example, a number of clicks per internet protocol (IP) address for a given time period, a number of unique queries per user session, a number of network clicks for a given time period and a number of distinct referral partners generating clicks for a given time period. Unique features of a given interaction include, for example, the time of the interaction, a search term of the interaction, and an IP address of the interaction. Thereafter, an operator uses predictive models and the data to identify the validity of interactions with the website. If invalid interactions are identified, the operator removes the invalid interactions, for example, before charging a client based on that interaction.

DETAILED DESCRIPTION OF THE PRESENTLY PREFERRED EMBODIMENTS

Methods and systems for determining the validity of user interactions over a client/server based computer network system are disclosed. For purposes of explanation, specific nomenclature is set forth to provide a thorough understanding of the present invention. Specific equations, including the form and constants of the equations, were arrived at through trial and error and the equations are the best equations known to the inventor at the time of filing. Descriptions of specific applications are provided only as examples. Various modifications to the preferred embodiments will be readily apparent to those skilled in the art, and the general principles defined herein may be applied to other embodiments and applications without departing from the spirit and scope of the invention.

Figure 1:
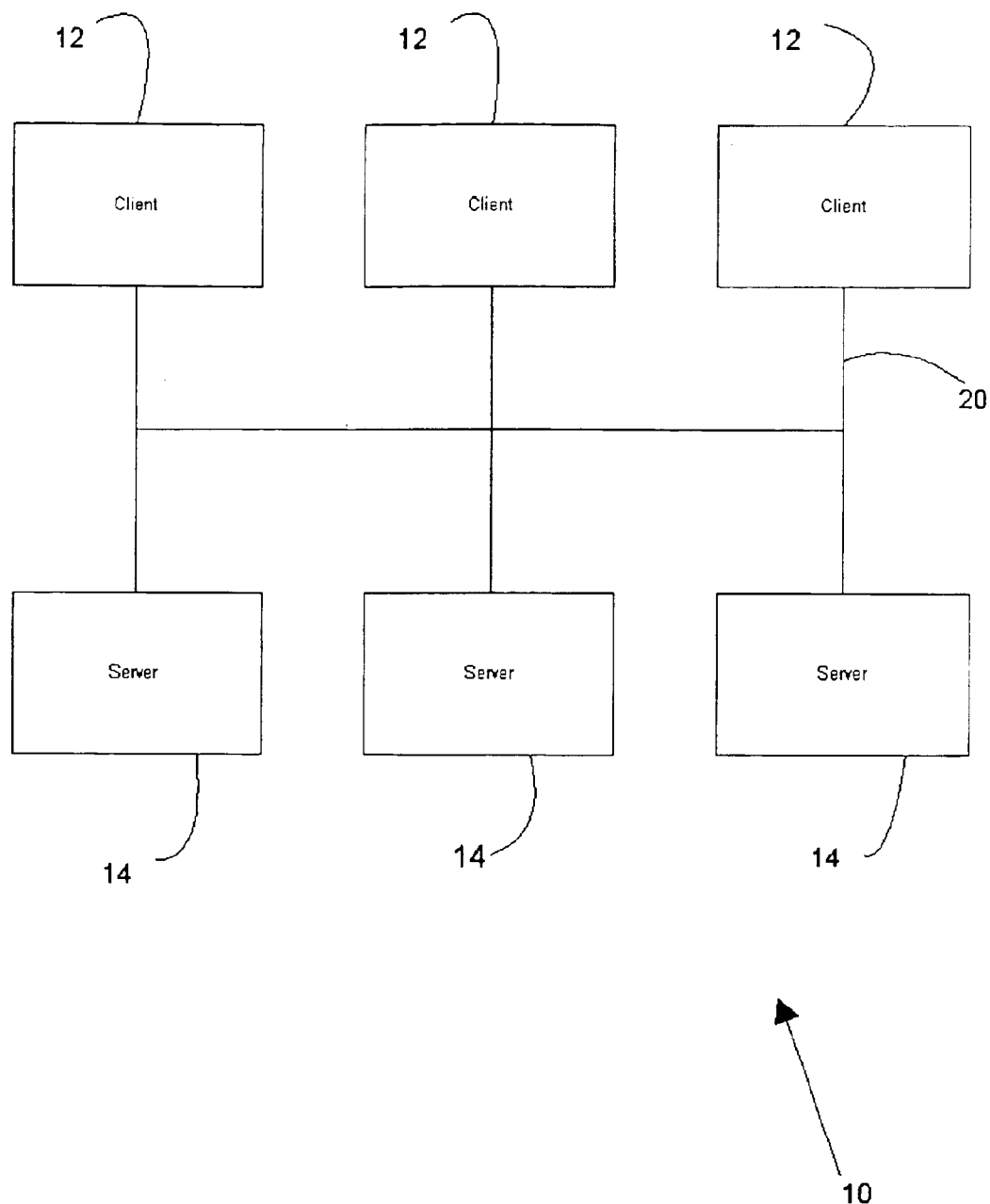
FIG. 1 illustrates an exemplary computer network system according to the preferred embodiments.

Referring now to the drawings, FIG. 1 is an example of a distributed system 10 configured as client/server architecture used in a preferred embodiment of the present invention. A "client" is a member of a class or group that uses the services of another class or group to which it is not related. In the context of a computer network, such as the Internet, a client is a process (i.e. roughly a program or task) that requests a service that is provided by another process, known as a server program. The client process uses the requested service without having to know any working details about the other server program or the server itself.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 comprising a plurality of client computers 12 and a plurality of servers 14, all of which are connected to a network 20. The network 20 will be hereinafter generally referred to as the Internet. Although the system and method of the present invention is specifically useful for the Internet, it should be understood that the client computers 12 and servers 14 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem. The servers 14 can be similarly configured. However, the server 14 may each include many computers connected by a separate private network. The network 20 may include hundreds of thousands of individual networks of computers.

A preferred embodiment of the present system and method includes two major components: one or more servers 14 on a network 20 to perform data processing, and software to control the computers. Preferred embodiments for the network hardware and software are described herein, however other equivalent hardware and software could be used.

An operator uses one or more of the servers 14 to determine the validity of interactions on a website. To determine the validity of interactions on the website the operator collects data as described below. The collected data is processed using algorithms described below. A preferred method of processing the collected data is described in commonly owned patent application Ser. No. 09/502,692 to John Joseph Carrasco et al. entitled "SYSTEM AND METHOD FOR RAPID COMPLETION OF DATA PROCESSING TASKS DISTRIBUTED ON A NETWORK," filed Feb. 11, 2000, which is incorporated by reference herein.

Figure 2:
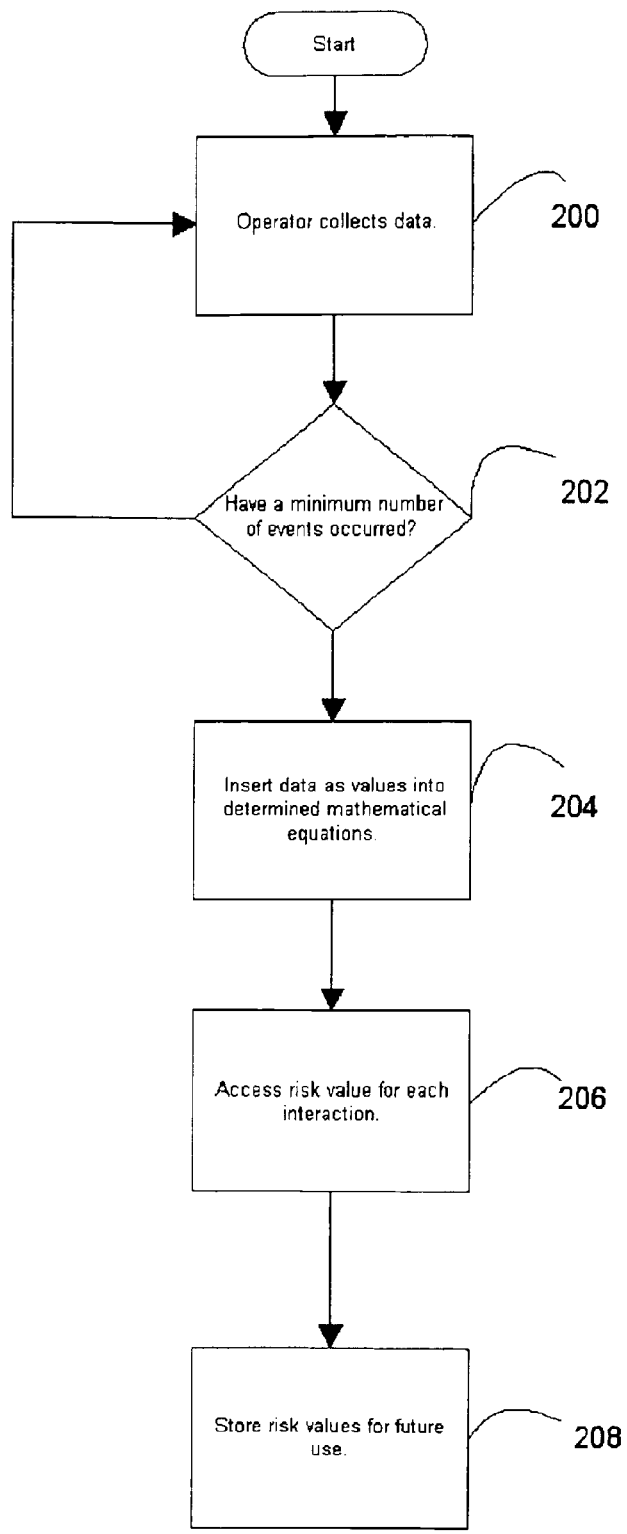
FIG. 2 is a flowchart illustrating the assignment of risk scores according to the preferred embodiments.
Figure 3:
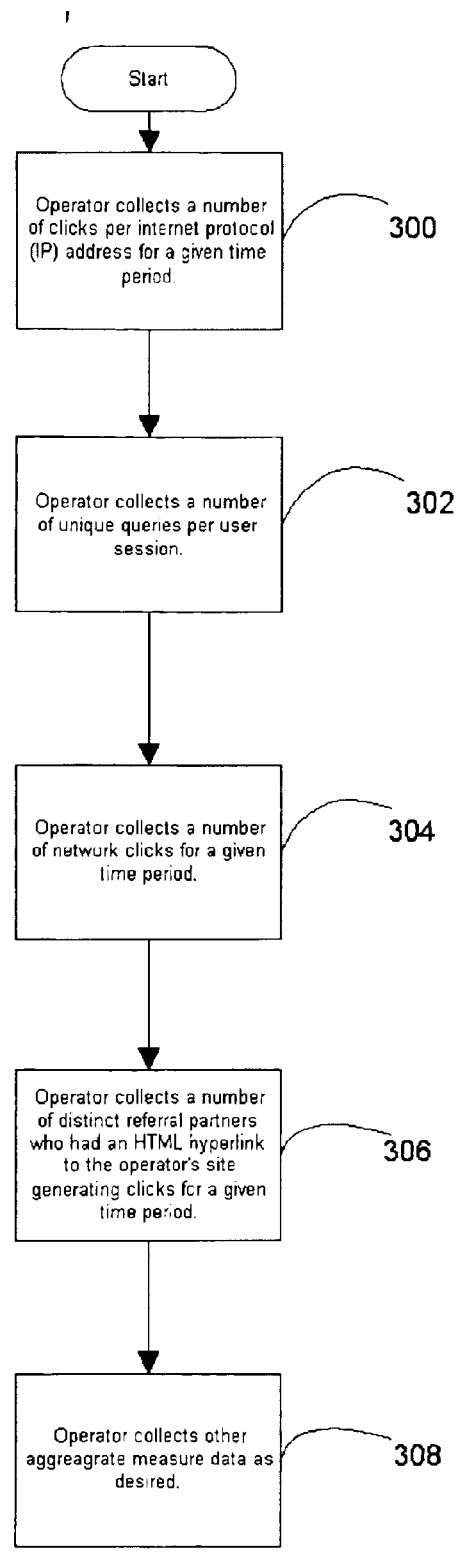
FIG. 3 is a block diagram illustrating collected aggregate measures of date according to the preferred embodiments.

A flow chart illustrated in FIG. 2 represents an assignment of risk scores to determine the validity of an interaction. An operator collects aggregate measures of behavior and unique features of a given interaction (block 200). Referring to FIG. 3, collection of the aggregate measures can include, for example, collecting information about a number of clicks per Internet Protocol (IP) address for a given time period (block 300), the number of unique queries per user session (block 302) and the number of network clicks for a given time period (block 304). Additional aggregate measures could also be used such as the number of distinct referral partners who had an HTML hyperlink to the operator's site generating clicks for a given time period (block 306), or fewer aggregate measures could be used. At block 308, other aggregate measures can also be collected as follows in Table 1:

TABLE 1

A. Search listing result aggregate measures -- used to help identify particular search results that are receiving abusive clicks:

1. number of unique user id's per search listing click / unit time;
2. number of unique user sessions per search listing click / unit time;
3. number of unique user input formatted queries per search listing click / unit time;

TABLE 1-continued 4. number of unique search identifiers per search listing click / unit time;
5. number of unique IP addresses per search listing click / unit time;
6. number of unique C networks per search listing click / unit time;
7. number of unique referring sites per search listing click / unit time; and
8. total number of clicks per search listing / unit time.
B. Referring source aggregate measures -- used to help identify referring sources which introduce sessions, searches or clicks that do not represent actual users using search services:

1. number of unique user id's per referring source / unit time;
2. number of unique user sessions per referring source / unit time;
3. number of unique user input formatted queries per referring source / unit time;
4. number of unique database input formatted queries per referring source / unit time;
5. number of unique search identifiers per referring source / unit time;
6. number of unique IP addresses per referring source / unit time;
7. number of unique C networks per referring source / unit time;
8. total number of paid clicks per referring source / unit time;
9. total number of unpaid clicks per referring source / unit time;
10. number of unique search listing clicks per referring source / unit time; and
11. total number of all clicks per referring source / unit time.
C. Advertiser aggregate measures -- used to help identify click attacks against particular advertisers 1. number of unique user id's per advertiser receiving any billable clicks / unit time;
2. number of unique user sessions per advertiser receiving any billable clicks / unit time;
3. number of unique user input formatted queries per advertiser receiving any billable clicks / unit time;
4. number of unique database input formatted queries per advertiser receiving any billable clicks / unit time;
5. number of unique search identifiers per advertiser receiving any billable clicks / unit time;
6. number of unique IP addresses per advertiser receiving any billable clicks / unit time;
7. number of unique C networks per advertiser receiving any billable clicks / unit time;
8. total number of billable clicks per advertiser receiving any billable clicks / unit time;
9. number of unique search listing clicks per advertiser receiving any billable clicks / unit time;
10. total number of all clicks per advertiser receiving any billable clicks / unit time; and
11. average time between click per advertiser receiving any billable clicks / unit time.
D. IP address aggregate measures -- used to help identify abusively clicking IP addresses:

1. number of unique user id's per IP address creating any billable clicks / unit time;
2. number of unique user sessions per IP address creating any billable clicks / unit time;
3. number of unique user input formatted queries per IP address creating any billable clicks / unit time;
4. number of unique database input formatted queries per IP address creating any billable clicks / unit time;
5. number of unique search identifiers per IP address creating any billable clicks / unit time;
6. total number of billable clicks per IP address creating any billable clicks / unit time;
7. number of unique search listing clicks per IP address creating any billable clicks / unit time;
8. total number of all clicks per IP address creating any billable clicks / unit time;
9. average time between click per IP address creating any billable clicks / unit time; and
10. total revenue generated per IP address creating any billable clicks / unit time.
E. C network aggregate measures -- used to help identify abusively clicking networks of IP addresses:

1. number of unique user id's per C network creating any billable clicks / unit time;

TABLE 1-continued 2. number of unique user sessions per C network creating any billable clicks / unit time;
3. number of unique user input formatted queries per C network creating any billable clicks / unit time;
4. number of unique database input formatted queries per C network creating any billable clicks / unit time;
5. number of unique search identifiers per C network creating any billable clicks / unit time;
6. number of IP addresses per C network creating any billable clicks / unit time;
7. total number of billable clicks per C network creating any billable clicks / unit time;
8. number of unique search listing clicks per C network creating any billable clicks / unit time;
9. total number of all clicks per C network creating any billable clicks / unit time;
10. average time between click per C network creating any billable clicks / unit time; and
11. total revenue generated per C network creating any billable clicks / unit time.

Figure 4:
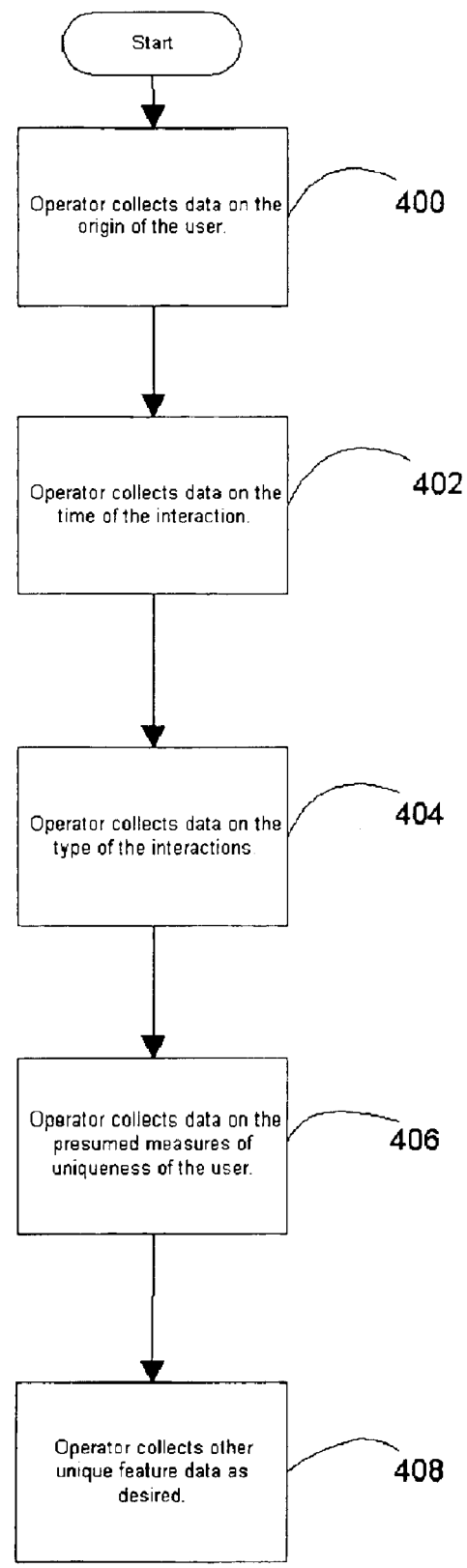
FIG. 4 is a block diagram illustrating collected unique feature data according to the preferred embodiments.

Referring to FIG. 4, the operator also collects unique feature data for a given interaction regarding, for example, the origin of the user (block 400), the time of the interaction (block 402), the type of the interaction (block 404) and presumed measures of uniqueness of the user such as user cookie information when available (block 406). A cookie is a mechanism that allows a website server to store information from the server for a particular user on the user's own computer. At block 408, other unique feature data can also be collected as follows in Table 2:

TABLE 2

1. date of revenue generating click;
2. timestamp of revenue generating click;
3. session identifier of revenue generating click;
4. referring source of revenue generating click;
5. IP address of revenue generating click;
6. C network of revenue generating click;
7. user input formatted query prior to revenue generating click;
8. database input formatted query prior to revenue generating click;
9. search listing identifier of revenue generating click;
10. search identifier of revenue generating click;
11. amount of revenue generated per revenue generating click;
12. search listing position (rank on results page);
13. revenue generating search listings returned per search performed;
14. total search listings returned per search performed; and
15. user agent interacting with the website.

Using the aggregate measures and unique feature data, the preferred embodiment system and method provides information concerning valid and invalid, legitimate and illegitimate, and desirable and undesirable website interactions based on statistical models.

Referring again to FIG. 2, the operator collects data points until sufficient interactions are collected to provide statistically valid results when modeling techniques are applied (block 202). The number of interactions required to generate statistical results varies and depends on the data being collected and the statistical inferences of interest. For example, for a website that facilitates tens of millions of interactions per day or more, 2000 randomly selected interactions could be collected to determine the average presumptive length of time spent interacting with the website. About 20,000 data points may be collected before a series of clicks on a link labeled "dog" could be statistically differentiated as legitimate or illegitimate in the context of the operator's website. Those skilled in the art will appreciate that a statistician can provide the computations of minimum number of data points required for any given question of statistical inference.

Furthermore, those skilled in the art also will appreciate that a website that facilitates tens of millions of interactions each day can provide the required number of sample data points for many statistical questions in relatively short time frames. For example, a website that facilitates more than 43.2 million interactions a day catalogues approximately 500 interactions per second. If the upper bound of the required data points for the questions of interest to a operator is 300,000, then such a high volume website could acquire the required data once every ten minutes.

To determine the validity of a user interaction with a website, aggregate and unique feature data are collected, inserted as values into mathematical equations described below and processed (block 204). The aggregate and unique feature data collected may contain information about searches, IP addresses, time of search, the session of the search or a group of searches tied to one apparent user of a search engine, the time of a click, the advertiser that received a click and the price the advertiser was willing to pay to receive a click. The aggregate and unique feature data can then be reduced to particulars of the search, e.g., search term: dog, time: 12:00:00 PM, IP Address: 192.168.1.1, Advertiser ID: ABC, Session ID: XYZ, Bid: $0.25. The data can be included in summaries, for example, the number of clicks by IP Address 192.168.1.1 for a given time interval and the number of searches on the word "dog" for a given time interval.

Figure 5:
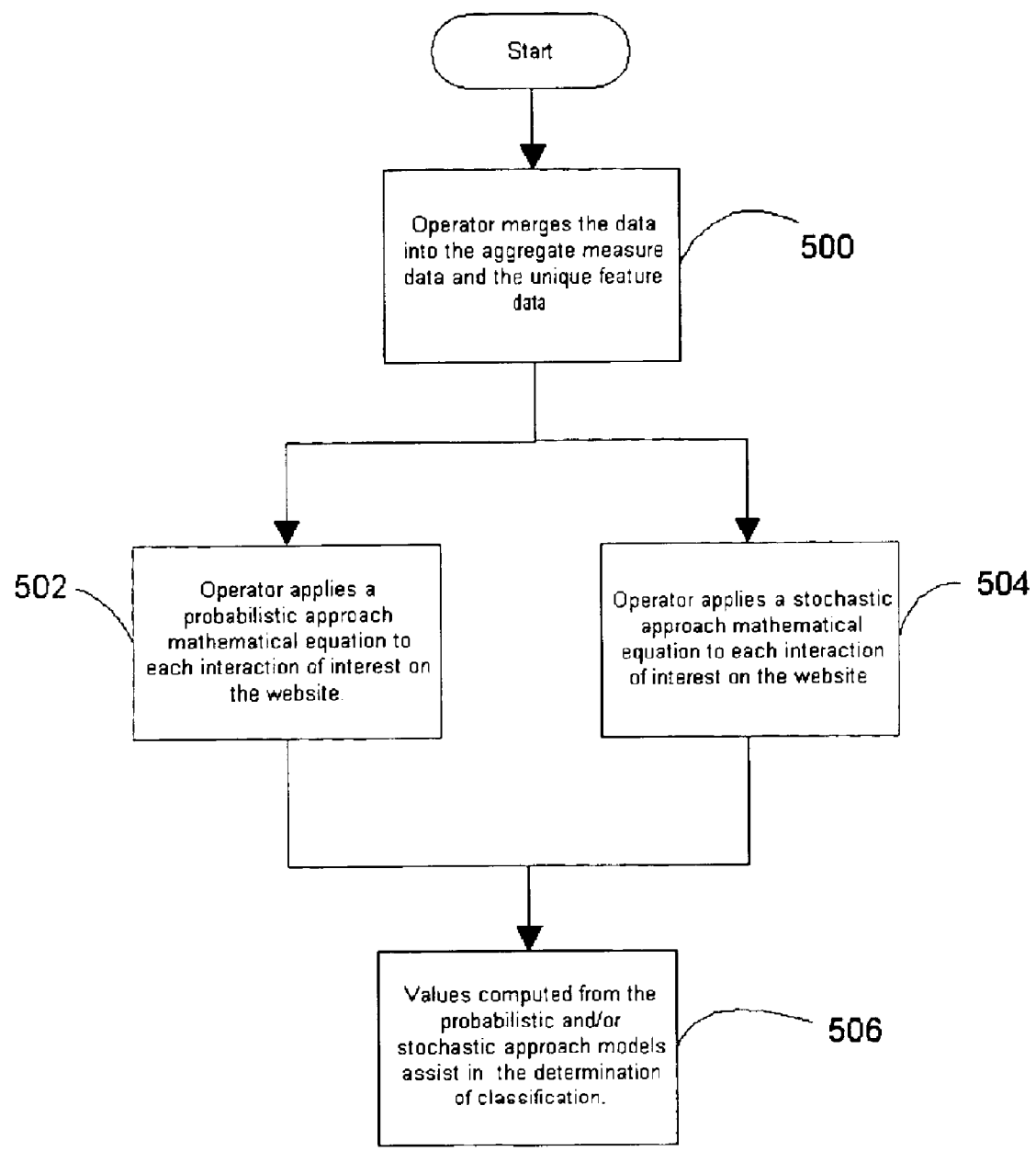
FIG. 5 is a block diagram illustrating a method for assessing the risk value of a interaction according to the preferred embodiments.

The aggregate measures and unique feature data are then processed to assess a risk value for each interaction (block 206). Referring to FIG. 5, the aggregate measure data and the unique feature data are merged (block 500). In tabular form, a part of any given data flow may look as follows:

TABLE 3

| Unique Features | | | Aggregate Measures | |
|---|---|---|---|---|
| Timestamp | IP Address | Search Term | Clicks/IP/Hour | Searches/Term/Hour |
| 12:00:00 | 192.168.1.1 | Dog | 2 | 2 |
| 12:35:00 | 192.168.1.1 | Cat | 2 | 1 |
| 12:59:59 | 192.168.5.5 | Dog | 1 | 2 |

A model, expressed in the form of a mathematical equation, is applied to each interaction, or set of interactions, of interest with the website. The exact expressions of the mathematical models may change over time, but the equations fall into two classes.

The operator applies one approach, a probabilistic approach (block 502). The probabilistic approach equation is expressed so that the result can quickly be transformed into a probability. The equation can be derived using commercially available statistical software, such as the SAS™ System, employing the commercially available software's calls to logistic regression routines. Exemplary equations can be found in "Applied Logistic Regression" authored by Hosmer & Lemeshow and published by Wilery in 1989 and SAS/STAT User's Guide, Vol. 2, Version 6, 4th Edition copyright 1990, SAS Institute, Cary, N.C., USA, which are incorporated by reference herein. The equations typically are of the form y=x'+k, where x' is a vector of parameters with coefficients; k is a constant and y is the result. In the case of logistic regression models, the result is transformed into a probability by the following formula: probability=$e^{(result)}/(1+e^{(result)})$. The constant e is described by the infinite series $$\sum_{n=0}^{n=\infty} 1/n!,$$

which approximately equals 2.71828. The value of this probability is a number between 0 and 1.

The probability expressed by the probabilistic class is the probability that a variable or group of variables belong to one of two classes, for example, valid or invalid interaction with a website. Exemplary probabilistic equations that describe legitimate and illegitimate interactions with a website are as follows:

Result=3.03+1.45*Unique Link Partners for a click within an hour+14.77*advertiser revenue within hour$^2$−6.38*(Unique user cookies within an hour/number of clicks within an hour). (Equation 1)

Result=4.786+3.85*(# unique search queries/# of clicks on an advertiser's site within an hour+0.467*(# of paid business partners for an advertiser link/# of unique user sessions observed within one hour)+3 if interaction occurs between 8 pm and midnight on Tuesdays. (Equation 2)

Equations 3–5 are similar in form to equations 1 and 2 but they are expressed in the Perl programming language:

my $resulthog=($sbc2clik*5.2378)−($uid2clik*9.5020)−($rev2rawq*0.0275)+($raw2clik*2.3453)+7.3735;

my $probhog=(exp $resulthog)/(1+exp $resulthog). (Equation 3)

Two lines of Perl code to identify IP addresses abusing paid listings my $resultquery=($sbc2clik*5.7424)+($src2sess*5.3571)−($src2clik*6.7800)−($iflag*0.3509)−($logcent*1.7096)+1.0651;

my $probquery=(exp $resultquery)/(1+exp $resultquery). (Equation 4)

Two lines of Perl code to identify excessive clicking based on a query and an affiliate driving the paid click.

my $resulthotspot=(($a[$ipct−1])*0.0136)−(($a[$sumrev−1])*0.00006)+(($a[$avgtimeDiff−1])*0.00145)+(($a[$avgtimeDiff−1])*($a[$ipct−1]−1)*2.3453)+3.1522;

my $probhotspot=(exp $resulthotspot)/(1+exp $resulthotspot). (Equation 5)

Two lines of Perl code to identify both clicking through ranks (regardless of order) and clicking through highlighted search terms.

Where sbc2clik=number of C networks generating a click on a paid listing within one hour;

uid2clik=number of user ids clicking on a paid listing in one hour;

rev2rawq=dollar amount of revenue produced in one hour by a paid listing divided by the number of raw search queries that yielded this paid listing;

raw2click=the number of raw queries in one hour that yielded a paid listing divided by the number of clicks on that paid listing in the hour;

src2sess=the ratio of paid sources to session IDs catalogued for a paid listing in one hour;

src2clik=the ratio of paid source to paid clicks for a paid listing in one hour;

iflag=a variable coded as 1 if src2rawq>3 and src2raw2<=5; otherwise this variable is coded as 0;

logcent=the log base 10 of the cents generated by a paid listing in an hour;

$a[$ipct-1]$ contains the number of unique IP addresses clicking on a paid listing in an hour;

$a[$sumrev-1]$ contains the sum of revenue in dollars within an hour for a paid listing; and $a[$avgtimeDiff-1]$ contains the average time difference in seconds between clicks within an hour on a given paid listing.

Those skilled in the art will recognize that both the coefficients to the variables in the equations and the input variables can change as behavior patterns on the site may change.

The form of the equation, however, does not change since the operator is interested in assessing the probability of an interaction's validity in a short time period. For example, if a number of undesirable billable interactions are observed with respect to a particular advertiser within an hour, the operator may respond by providing an alert to the advertiser that the behavior has been identified. The advertiser then may wish to change the terms of their advertising contract or the advertiser could be provided with automatic adjustments to their account to remove the cost of the unwanted interactions. Other measures include ignoring the clicks from the particular IP address supplying invalid interactions and turning off the accounts of the advertiser.

If the mathematical models produced by the probabilistic approach are inadequate, or if a prior state of validity is not known with great certainty, the operator may choose to create mathematical models via another approach. One approach derives mathematical forms that minimize the distance to hypothesized or estimated group means. The approach is known in statistics as discriminant analysis and can be loosely categorized as a stochastic approach (block 504). The stochastic approach yields sets of mathematical equations that are described as linear discriminant functions. Those skilled in the art will recognize that the equations can be derived using commercially available statistical software.

Figure 6:
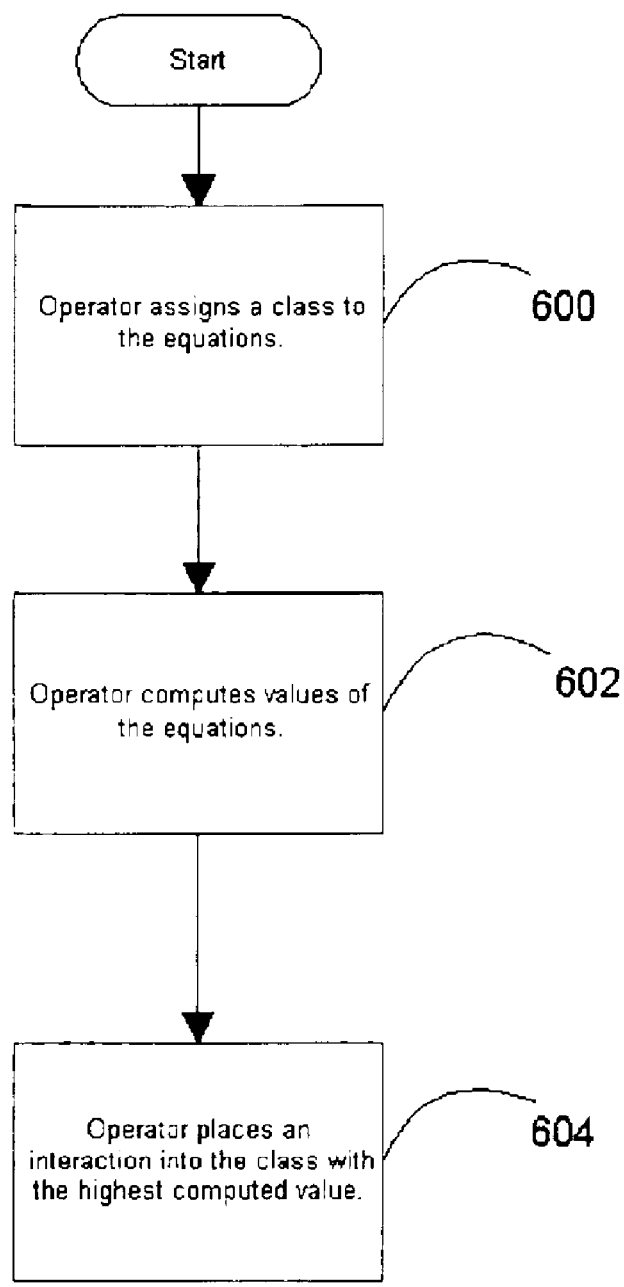
FIG. 6 is a block diagram illustrating a method for applying a stochastic class of mathematical equations to a network interaction according to the preferred embodiments.

Referring to FIG. 6, the operator assigns the equations a class, for example, acceptable but unusual behavior, normal behavior and unacceptable behavior (block 600). Values for the three equations are computed (block 602). The equation with the maximum value is the class into which a particular interaction is placed (block 604). For example:

Acceptable But Unusual Class (*ABUC*) Value=3*IP address–
7*(User Cookies/Clicks on advertiser links). (Equation 6)

Normal Behavior Class (*NBC*) Value=12*Number of Paid Clicks–
6*unique user queries. (Equation 7)

Unacceptable Class (*UC*) Value=(# of paid advertiser clicks)*(unique IP addresses generating clicks)+1/(# of unique search queries). (Equation 8)

If for one interaction the ABUC has a value of 12, the NBC has a value of 11.5 and the UC has a value of 13, then the interaction falls into the UC group.

Referring again to FIG. 2, the operator preferably stores the risk values and takes appropriate actions following such classification of individual interactions (block 208). The stored values can be used in a variety of ways, for example to produce reports.

Referring again to FIG. 5, the preferred embodiments use probabilistic and/or stochastic approaches to determine the validity of individual interactions with a website (block 506). The operator can determine which of the two methods or combination of methods are appropriate to interactions at a given time. Thus, using the collected aggregate measure and unique feature data, and the equations described above, an operator can determine the validity of a user interaction with the network. After processing the aggregate and unique feature data, the operator can determine if a particular interaction falls with the acceptable but unusual class, normal behavior class or unacceptable class. The operator can handle an interaction as needed, such as by removing an unacceptable class interaction from a report used to charge network operators.

Figure 7:
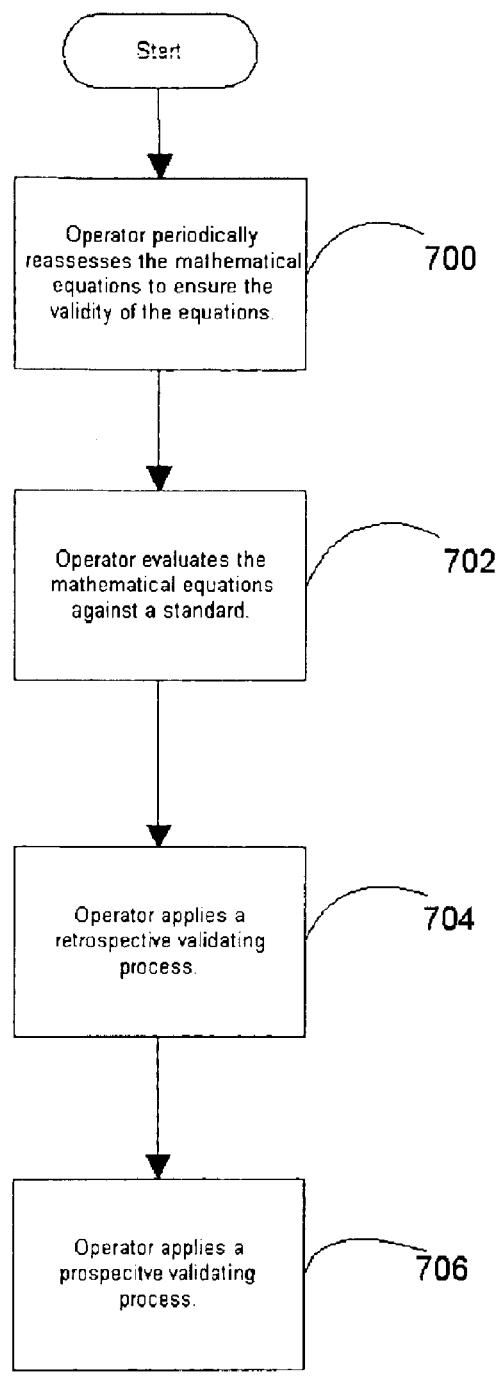
FIG. 7 is a block diagram illustrating a method for verifying risk-assessing equations according to the preferred embodiments.

Referring to FIG. 7, as more data from the website is gathered and stored, the operator preferably periodically reassesses the mathematical equations used to make the classification decisions, to ensure the validity of the equations (block 700). Commodity statistical analysis software produces models for sets of inputs, regardless of the irregularity of the inputs. Thus, once the operator produces models using the statistical software, the operator evaluates the models against another standard (block 702). The other standard usually is taken to be the measure of the classification outcome at the time of the analysis. For example, if someone develops software to perform pattern recognition analysis on bone fragments for the purposes of species classification, the pattern recognition software, i.e., statistical models, would best be evaluated against the judgments of a scholar who specializes in identifying species by looking only at bone fragments.

The operator, who can observe many website interactions, desirable and undesirable, can apply two sets of model validating processes. The first of these two model validation techniques is retrospective (block 706).

Figure 8:
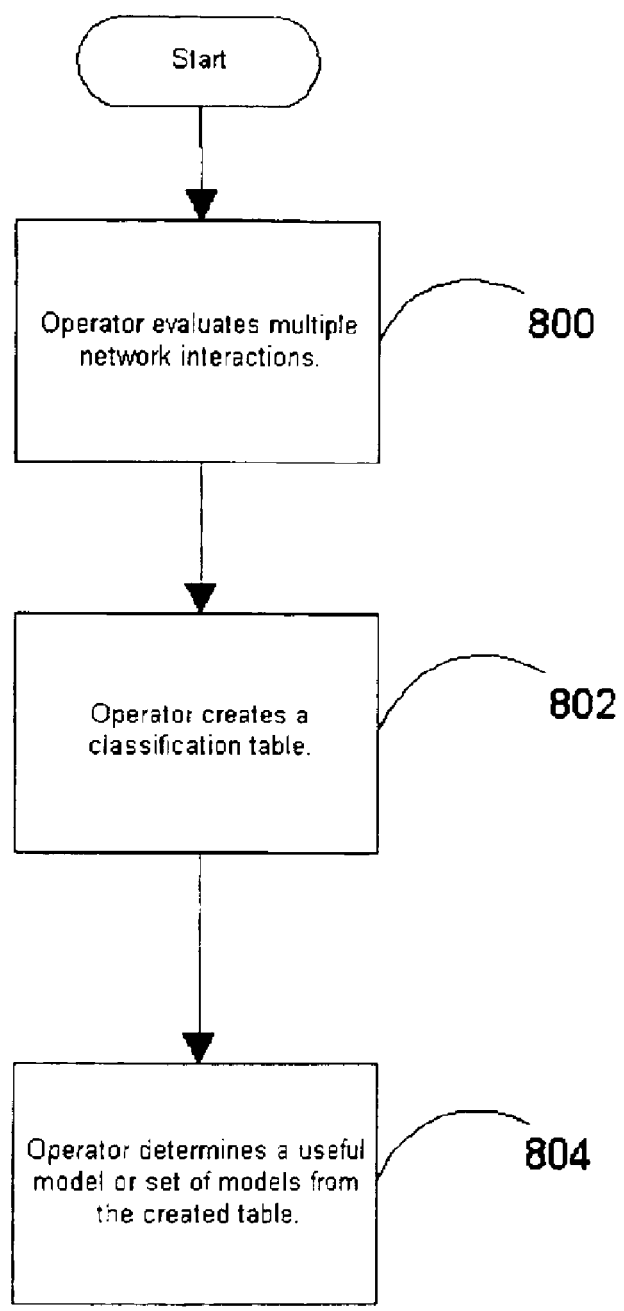
FIG. 8 is a block diagram illustrating a method for evaluating a risk model using a retrospective analysis according to the preferred embodiments.

Referring to FIG. 8, the outputs of the models are evaluated by, for example, a domain expert using the model's input data stream. The domain expert evaluates multiple interactions, for example, hundreds or thousands of interactions, upon which the models are built, cataloging each one as valid or invalid (block 800). The domain expert can then create a two-by-two classification table as follows (block 802):

TABLE 4

| | Domain Expert: Invalid | Domain Expert: Valid |
|---|---|---|
| Computer: Invalid | "True Positives" | "False Positives" |
| Computer: Valid | "False Negatives" | "True Negatives" |

Using the table, the domain expert can discern a useful set of models, e.g., one that has very few false positives and very few false negatives (block 804). The exact number or percentage of false positives and false negatives that is acceptable depends on the overall level of reliability given to the domain expert and what kinds of mistakes are more acceptable, false positives or false negatives. In the above example where network operators monitor user interactions with a web site to charge customers, false positives are relatively acceptable, since the false positives result in underreporting legitimate site usage statistics, i.e., erring on the side of caution. False negatives are not as acceptable, since false negatives lead to reporting on data that has been "tainted" with invalid interactions.

As described herein, the statistical models that are considered valid have false negative percentages in the general vicinity of 0.25% (ranging from 0.16% to 0.60%) and false positive percentages in the 2.50%–7.50% range. Those skilled in the art will recognize that acceptable misclassification rates vary with business needs for reliability and accuracy versus the need for time efficacious decision-making. In some fields, for example, cancer diagnosis, the rates of misclassification is typically very low or non-existent to be considered acceptable. In other fields, however, higher misclassification rates are acceptable. In the business domain, typical acceptable misclassification rates are stated above, e.g., having a low false negative rate and a oderate false positive rate. Likewise, those skilled in the art will recognize that acceptable misclassification rates also are a function of the tools and available domain experts.

Referring again to FIG. 7, the second validation technique proceeds similar to the first one. A difference is that website interaction data that the computer has not yet incorporated into its model building algorithm is fed into the models and also supplied to the operator. A two-by-two classification table, e.g., similar to Table 4, is created but now the table indicates the validity of the data going forward in time, rather than applying only to the data available to the computer at model building time (block 706).

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

I claim:

1. A method of identifying illegitimate interactions of a presumed user on a network, the method comprising:

collecting data from user interactions on a network, the data including aggregate measure data and unique feature data about the presumed user;

storing the data in a database;

building predictive models with the aggregate measure and unique feature data to identify illegitimate interactions with the network;

wherein building the predictive models includes:

applying a mathematical model of interactions derived from at least one probabilistic mathematical equation;

applying a mathematical model of interactions based on at least one stochastic mathematical equation; and determining a legitimacy of the interactions using the stochastic and probabilistic mathematical equations; and identifying the illegitimate interactions in the database using the predictive models.

2. The method of claim 1 where the at least one probabilistic approach includes logistic regression.

3. The method of claim 1 where the at least one stochastic approach includes linear discriminant analysis.

4. The method of claim 1 further including:

assigning a classification to the value created by the probabilistic and stochastic derived mathematical models of interaction;

computing values of the probabilistic and stochastic derived mathematical models of interaction;

for the probabilistic mathematical models, placing an interaction into a class based on a computed probability of belonging to that class; and for the stochastic mathematical models, placing an interaction into the class with the highest computed value.

5. The method of claim 4 further including:

periodically reassessing the probabilistic and stochastic mathematical models against a standard;

applying a retrospective validating process; and applying a prospective validating process.

6. The method of claim 1 further comprising:

evaluating multiple network interactions by both using the predictive models and without using the predictive models;

creating a classification table based on the evaluating; and choosing at least one of the predictive models to use based on the classification table.

7. The method of claim 1 further including:

creating a database of illegitimate interactions.

8. The method of claim 7 further including:

evaluating the database to ensure that the probabilistic and stochastic derived mathematical models of interaction are reliable; and discarding unreliable probabilistic and stochastic mathematical models of interaction.

9. The method of claim 8 further including:

collecting additional aggregate measure and unique feature data; and deriving new probabilistic and stochastic derived mathematical models of interaction based on existing collected data and the additional collected aggregate measure and unique feature data.

10. The method of claim 1 where the collection of aggregate measure data comprises:

collecting data on a number of clicks per internet protocol address for a given time period;

collecting data on a number of unique queries per user session;

collecting data on a number of network clicks for a given time period; and collecting data on a number of distinct referral partners who could access the network.

11. The method of claim 1 where the collection of unique feature data comprises:

collecting data on an origin of the presumed user;

collecting data on a time of the interactions;

collection data on a type of the interactions; and collecting data on presumed measures of uniqueness of the presumed user.

12. A method for creating reports according to website interactions after determining the validity of the website interactions, the method comprising:

collecting aggregate measure data and unique feature data about the website interaction;

building predictive models with the aggregate measure and unique feature data to identify undesirable interactions with the website, wherein statistical data analysis techniques are used to create predictive models of undesirable interactions;

applying the statistical data analysis techniques to identify undesirable interactions with the website before removing the undesirable interactions from the reports; and removing the undesirable interactions from the reports, once identified.

13. The method of claim 12 wherein the predictive models are used to produce at least one of a probability value and a behavior group.

14. The method of claim 13 further including:

formulating a business rule about which probability value or behavior group constitutes undesirable interactions with the Website.

15. The method of claim 12 further including: creating a database of undesirable interactions.

16. The method of claim 15 further including:
evaluating the database to ensure that the predictive models are reliable; and
discarding unreliable predictive models.

17. The method of claim 16 further including:
collecting additional aggregate measure and unique feature data; and
deriving new predictive models based on existing collected data and the additional collected data.

18. The method of claim 12, wherein the predictive model is biased in favor of a customer.

19. A system for creating reports according to website interactions after determining the validity of the website interactions, the method comprising:
a first processor to collect aggregate measure data and unique feature data about a website user;
a second processor to create predictive models with the aggregate measure and unique feature data to identify undesirable interactions with the website, wherein statistical data analysis techniques used to create the predictive models of undesirable interactions and wherein the statistical data analysis techniques are used to identify undesirable interactions with the website before removing the undesirable interactions from the reports, wherein the undesirable interactions are removed from the reports, once identified.

20. The system of claim 19 wherein the predictive models are used to produce at least one of a probability value and a behavior group.

21. The system of claim 20 wherein a business rule is formulated about which probability value or behavior group constitutes undesirable interactions with the Website.

22. The system of claim 19 wherein a database is created of undesirable interactions.

23. The system of claim 22 wherein the database is evaluated to ensure that the predictive models are reliable and unreliable predictive models are discarded.

24. The system of claim 23 wherein new data is collected and new predictive models are derived based on existing collected data and the new collected data.

25. The system of claim 19 wherein the predictive model is biased in favor of a customer.

26. A method of rating user interactions on a network, the method comprising:
collecting data from user interactions on a network, the data including aggregate measure data and unique feature data about the user;
storing the data in a database;
building predictive models with the aggregate measure and unique feature data to rate the interactions with the network;
wherein the building predictive models comprises:
applying a probabilistic approach to mathematical modeling of the interactions; and
applying a stochastic approach to derive mathematical models of the interaction; and
identifying interactions on the network using the probabilistic and stochastic mathematical models of interaction.

27. The method of claim 26 further including identifying illegitimate interactions on the network.

28. The method of claim 26 further including identifying invalid interactions on the network.

29. The method of claim 26 further including identifying unauthorized interactions on the network.

30. The method of claim 26 further including:
assigning a class to values computed from the probabilistic and stochastic derived mathematical equations;
computing the values of the probabilistic and the stochastic mathematical models of interaction;
for the probabilistic mathematical models, placing an interaction into a class based on the computed probability of belonging to the class; and
for the stochastic models, placing an interaction into the class with the highest computed value.

31. The method of claim 30 further including:
periodically reassessing the probabilistic and stochastic mathematical equations against a standard;
applying a retrospective validating process; and
applying a prospective validating process.

32. The method of claim 31 further comprising:
evaluating multiple network interactions;
creating a classification table; and
determining a model of interactions from the classification table.

33. The method of claim 26 further including:
creating a database of interactions.

34. The method of claim 33 further including:
evaluating the database to ensure that the probabilistic and the stochastic mathematical models of interaction are reliable; and
discarding unreliable probabilistic and stochastic mathematical models of interaction.

35. The method of claim 34 further including:
collecting additional aggregate measure and unique feature data; and
deriving new probabilistic and stochastic mathematical models of interaction based on existing collected data and the additional collected data.

36. The method of claim 26 where the collection of aggregate measure data comprises:
collecting data on a number of clicks per internet protocol address for a given time period;
collecting data on a number of unique queries per user session;
collecting data on a number of network clicks for a given time period; and
collecting data on a number of distinct referral partners who could access the network.

37. The method of claim 26 where the collection of unique feature data comprises:
collecting data on an origin of the user;
collecting data on a time of the interactions;
collection data on a type of the interactions; and
collecting data on presumed measures of uniqueness of the user.

* * * * *